(No Model.)  2 Sheets—Sheet 1.
J. D. SCHOFIELD.
PLANTER.
No. 602,173. Patented Apr. 12, 1898.
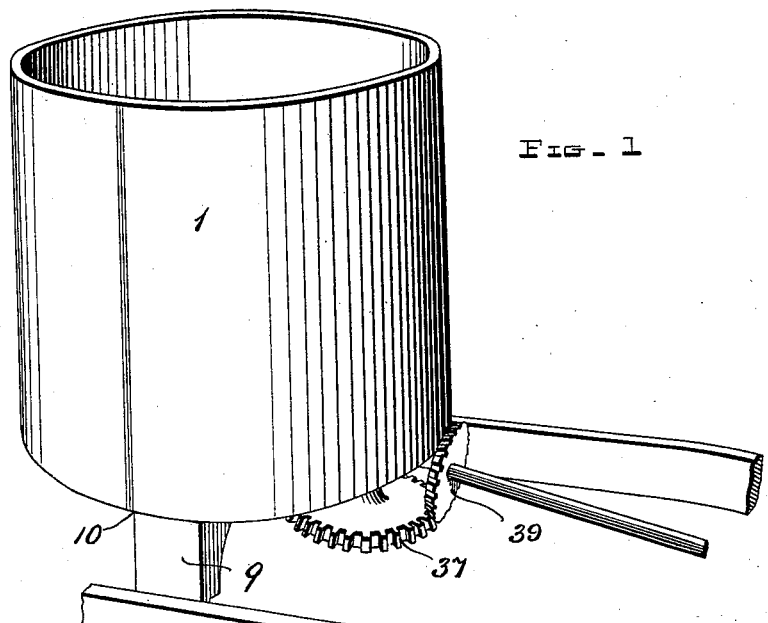
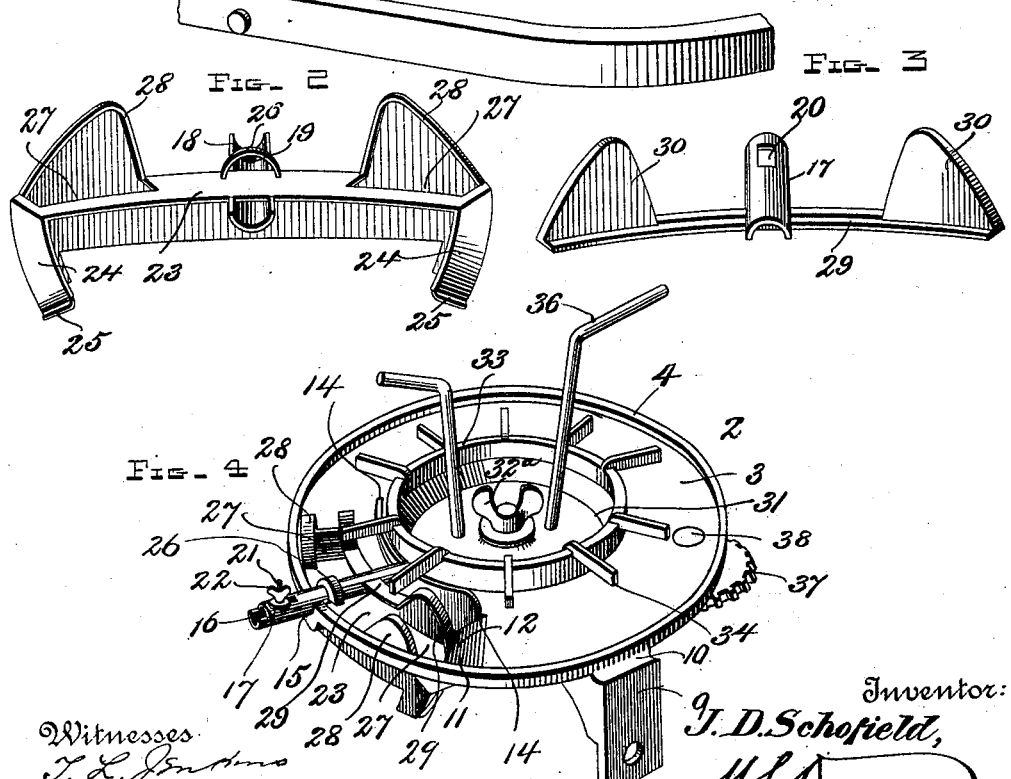
Witnesses
T. L. Jenkins
C. D. Young
Inventor:
J. D. Schofield,
By W. J. Duvall,
Attorney (No Model.) 2 Sheets—Sheet 2.
J. D. SCHOFIELD.
PLANTER.
No. 602,173. Patented Apr. 12, 1898.
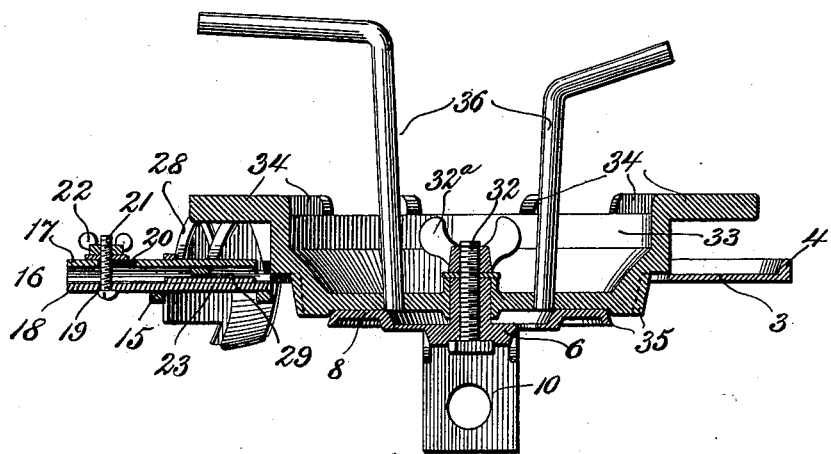
Fig. 5
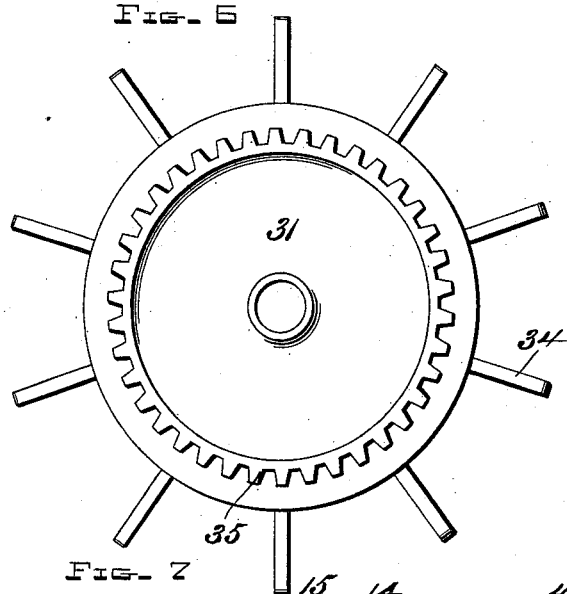
Fig. 6
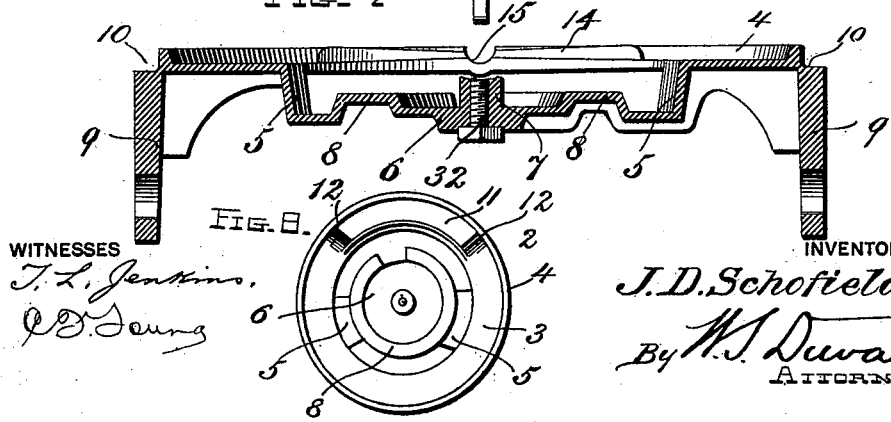
Fig. 7
Fig. 8
WITNESSES
T. L. Jenkins.
C. D. Young.
INVENTOR
J. D. Schofield,
By W. T. Duvall,
ATTORNEY.

UNITED STATES PATENT OFFICE.

JAMES DROMMOND SCHOFIELD, OF DALLAS, TEXAS.

PLANTER.

SPECIFICATION forming part of Letters Patent No. 602,173, dated April 12, 1898.

Application filed September 17, 1897. Serial No. 652,012. (No model.)

*To all whom it may concern:*

Be it known that I, JAMES DROMMOND SCHOFIELD, a citizen of the United States, residing at Dallas, in the county of Dallas and State of Texas, have invented certain new and useful Improvements in Planters; and I do hereby declare the following to be a full, clear, and exact description of the invention, such as will enable others skilled in the art to which it appertains to make and use the same.

My invention relates to improvements in cotton-planters, and has special reference to the feed mechanism of such, although, as will hereinafter appear, it will be apparent that the machine is well adapted for distributing the various commercial fertilizers now in general use.

Among the prime objects of my invention are to produce a cheap, simple, and durable feed mechanism which is positive in its action, which is adapted to be operated by the cotton-disk, which avoids the use of springs of any kind, which is readily adjustable, so as to regulate the feed or output of cotton-seed, and which will avoid any crushing or breaking of the seed as they are delivered and prevent them from hanging together and bunching as they are dropped therefrom.

Other objects and advantages of the invention will appear in the following description, and the novel features thereof will be particularly pointed out in the claims.

Referring to the drawings, Figure 1 is a perspective view of a hopper, a portion of the framework, and of the driving-gear of a cotton-planter or fertilizer-distributer. Figs. 2 and 3 are details in perspective of the feed-plate and its adjusting device, respectively. Fig. 4 is a perspective view of the bottom of the hopper and the parts carried thereby. Fig. 5 is a radial sectional view of Fig. 4. Fig. 6 is a bottom plan view of the cotton-feed disk. Fig. 7 is a radial sectional view of the hopper-bottom in detail. Fig. 8 is a detail in plan view of the hopper-bottom casting.

It is to be understood at the outset that the invention hereinafter detailed relates wholly to the feed mechanism—that is, the mechanism employed for automatically dropping the cotton-seed and contained within or supported by the hopper. Therefore it is evident that any style of hopper-supporting frame and any mechanism desired may be employed for conveying motion to the feed mechanism to be described.

The hopper 1 is preferably cylindrical and is constructed with a cast-metal bottom 2. The bottom 2 comprises an annular outer ring portion 3, which may be surrounded by an annular raised or superficial bead 4. At diametrically opposite points there depends from the inner edge of the ring portion 3 L-shaped brackets 5, which support at their inner ends a depressed supporting-disk 6. From the center of this disk rises a hollow or bored stud 7, and the latter is surrounded by a circular slightly-raised track 8, which is below the plane of the upper end of the stud 7 and the ring portion 3. It will be apparent that these parts—to wit, the ring portion 3, the supporting-disk, its track and stud—may be conveniently cast in a single piece, as may also a pair of depending perforated supporting-standards 9, that are located at diametrically opposite points of the bottom 2 and which may be provided at their upper ends with steps or shoulders 10, upon which the bottom edge of the hopper-wall may rest. In the present instance at a rear point the ring portion 3 is provided with a segmental feed-slot 11 for about a quarter (more or less) of its circumference, and the opposite ends of the feed-slot may be inclined toward each other, as at 12, the metal of the bottom being so disposed as to connect the sides of the depressed or inclined ends with the under side of the ring portion, so that, as will be obvious, I thus produce at opposite ends of the feed-slot feed-chutes.

The inner edge of the feed-slot of the ring portion is supplied with a narrow vertical flange 14, which increases in depth toward its ends, which occur opposite the chutes. In this flange at its center and in the opposite sides of the ring at the center of the feed-slot are formed diametrically-alining bearings 15, in which is supported a short rock-shaft 16, the outer end of which may extend rearwardly beyond the hopper-wall 1.

The rock-shaft 16 is preferably divided longitudinally, forming an upper sliding half 17 and a lower stationary half 18, the latter in reality forming the journal-points of the shaft. The two halves 17 and 18 may be adjustably connected and secured by any suitable means. The lower half 18 is in the present instance perforated near its rear end, as at 19, and the upper half 17 is correspondingly slotted, as at 20. Passed upwardly through the perforation and slot is a bolt 21, a washer and winged nut 22 being located on the upper end thereof. It will be seen that by loosening the nut the upper half of the rock-shaft may be slipped in and out and by retightening the nut the two halves will be secured rigidly together.

Cast integral or secured to the inner portion of the lower half 18 of the rock-shaft 16 is a curved or segmentally-shaped feed-plate 23, the same terminating in depending cut-offs or walls 24, the curvature being concentric with the rock-shaft 16. These cut-offs 24 are the same distance apart as are the lower ends of the chutes of the feed-slot or a fraction less, so that as the feed-plate oscillates or vibrates the cut-offs contact with the ends of the chutes, and inasmuch as they (the cut-offs) in reality form the inner walls of said chutes the latter are alternately opened and closed at their inner sides. The oscillating or vibratory movements of the feed-plate are limited by means of suitable stops—in this instance lateral flanges 25—formed at right angles to and extending outwardly from the lower ends of the cut-offs and alternately abutting against the lower ends of the chutes.

The feed-plate may be provided with a loop 26 on its upper side, the same serving as a guide for the upper half 17 of the rock-shaft 16. Thus it will be seen that the upper half of the rock-shaft 16 overlaps or rests upon the upper side of the feed-plate. At each side of this loop 26, and therefore at opposite sides of the transverse center of the feed-plate, the latter is provided with elongated feed-slots 27, at the outer edges of which are located cam-lugs 28 of substantially inverted-V shape.

The upper or adjustable half 17 of the rock-shaft 16 carries at its inner end a curved slide or gage plate 29, which is located and adapted to slide upon the feed-plate and to cover (more or less) the feed-slots, thus increasing or diminishing the output or discharge of the machine. At points opposite the feed-slots the slide or gage plate 29 may have formed upon its opposite side cam-lugs 30, which, it will be seen, aline with the companion cam-lugs 28 of the feed-plate and correspond to the shape of the same.

Fitting within the ring portion 3 of the hopper is the cotton-disk 31, the same having its bottom supported by the circular track of the supporting-disk. The cotton-disk is formed with a central flanged opening which loosely receives the stud of the supporting-disk, and any ordinary means may be employed for retaining the cotton-disk in position for rotation on the circular track—as, for instance, a bolt 32, passed upwardly through the stud and provided at its upper end with a washer and winged nut 32ª.

The cotton-disk may be provided with an annular vertical flange 33, either formed integral therewith or secured thereto. In either instance, however, the aforesaid flange or edge of the disk is formed or provided with radiating trip fingers or arms 34, located in the same circular and horizontal plane as the cam-lugs of the feed-plate and its gage-plate and of less distance apart than the pairs of cam-lugs carried by said plates. As a result, it will be apparent that as the cotton-disk rotates its radial fingers or arms 34 are successively brought into contact with first one pair of cam-lugs and then the other, and riding over the inclined faces of the same causes the feed-plate to be depressed first at one end and then the other, thus opening and closing the chutes alternately and at each depression permitting the cotton-seed to pass into and drop through the feed-openings of the feed-plate. By regulating the gage-plate the size of feed-openings may be increased or diminished, and thus the machine caused to sow the proper quantity at each dropping. Of course the cotton-disk may be provided with any necessary or desired adjuncts—such, for instance, as the stirring-arms 36.

It will be understood that any means may be employed for rotating the cotton-disk, and such means might require a slight alteration in the cotton-disk, all of which is comprehended by my invention. In the present instance, as an illustration of one of the many ways that the disk may be driven or rotated, I illustrate the same as having its lower edge toothed, as at 35. These teeth may mesh with and thus the disk be driven by a small bevel wheel or gear 37, that is journaled on a depending stub-shaft 38, secured to the hopper-bottom. The gear 37 is driven by any suitable train of gear 39 and shafting leading from the ground-wheel, as is usual.

It will be apparent from the foregoing that I have secured all the various objects of my invention as set out and produce a feed for cotton-seed that is positive, easy-running, that may be regulated, and the parts of which may be readily replaced at a very slight cost when worn or broken.

I do not limit my invention to the exact details of construction herein shown and described, but hold that I may vary the same to any degree within the knowledge of the skilled mechanic without departing from the spirit or sacrificing the advantages thereof.

Having described my invention, what I claim is—

1. In a planter, the combination with a hopper having a bearing, and a feed-disk mounted for horizontal rotation on the bearing and provided with radial arms, of means for rotating the said feed-disk, and a vibratory feed device located in a slot in the hopper and having an upwardly-disposed end arranged in the path of and adapted to be struck and depressed by the said radial arms of the feed-disk.

2. In a planter, the combination with a hopper having a feed-slot, of a vibratory feed device fulcrumed between its ends in said slot, a cotton-feed, and means for alternately depressing the ends of said feed device.

3. In a planter, the combination with a hopper having a feed-slot, and a vibratory feed-plate having opposite end feed-openings and fulcrumed between its ends in said slot, of a feed-disk, means for rotating the same, and means for vibrating the feed-plate so as to alternately depress its ends and openings below the level of the feed-slot.

4. In a planter, the combination with a hopper the bottom of which is provided with a feed-slot, and a centrally-pivoted vibratory feed-plate having feed-openings at opposite sides of its center, of a feed-disk mounted for rotation in the hopper-bottom and provided with radial arms adapted to travel over said plate, and cam-lugs arranged on the feed-plate in the path of the arms of the feed-disk.

5. In a planter, the combination with a hopper having a feed-slot in its bottom, a vibratory feed-plate intermediately pivoted therein and provided with feed-openings near its opposite ends, and means for opening and closing the openings, of a feed-disk adapted to depress alternately the ends of the plate, and means for rotating said disk.

6. In a planter, the combination with a hopper having its bottom provided with a feed-slot, a centrally-pivoted vibratory feed-plate located therein and having openings near its ends, the edges of which are provided with upwardly-disposed cam-lugs, of a rotary feed-disk, and means for operating the same.

7. In a planter, the combination with a hopper the bottom of which is provided with a feed-slot, a feed-plate pivoted intermediately therein and provided with feed-openings, and a gage-plate located on the feed-plate and adapted to overlap the feed-openings therein, of means for vibrating said feed-plate so as to depress its ends alternately below the bottom of the hopper, a feed-disk, and means for operating the same.

8. In a planter, the combination with a hopper having a feed-slot in the bottom at one side of its center, and bearings formed in the opposite edges of the same, a longitudinally-divided rock-shaft journaled therein, means for adjusting one of said shaft-sections with relation to the other, a feed-plate having opposite openings mounted in the feed-slot and supported by the stationary section of the rock-shaft, and a gage-plate adapted to cover said openings carried by the adjustable section of the shaft, of means for depressing alternately the ends of the feed-plate, a feed-disk, and means for rotating the same.

9. In a planter, the combination with a hopper the bottom of which is provided with a feed-slot, a divided rock-shaft journaled intermediate the ends thereof, a feed-plate having opposite openings supported by the lower shaft-section, a gage-plate located on the feed-plate, cam-lugs carried by the feed-plate and gage-plate, and means for securing the shaft-sections in their adjusted positions, of a feed-disk having arms radiating therefrom and adapted to strike the cam-lugs alternately, and means for rotating the feed-disk.

10. In a planter, the combination with the hopper the bottom of which is provided with a feed-slot located at one side of its center, said slot having transversely-opposite bearings and terminating at its ends in inwardly-disposed depressed chutes, a feed-plate mounted for vibration in the feed-slot and journaled in the bearings and terminating at its ends in depending curved cut-offs and provided at each side of its center with feed-openings, of a rotatable feed-disk journaled in the hopper, means for depressing alternately the ends of the feed-plate whereby their feed-openings are brought opposite the lower ends of the chutes, and means for rotating the feed-disk.

11. In a planter, the combination with the hopper the bottom of which is provided with a feed-slot located at one side of its center, said slot having transversely-opposite bearings and terminating at its ends in inwardly-disposed depressed chutes, a feed-plate mounted for vibration in the feed-slot and journaled in the bearings and terminating at its ends in depending curved cut-offs and provided at each side of its center with feed-openings, of cam-lugs located at opposite sides of the center of the feed-plate, a rotatable feed-disk mounted in the bottom of the hopper and provided with radiating arms adapted to strike said lugs successively, and means for rotating said feed-disk.

12. In a planter, the combination with the hopper-wall, a ring located therein and a disk supported below and by the ring and having an annular track, the ring being provided with a curved slot at one side, the ends of the slot terminating in depressed chutes, a rotatable feed-disk located on the track and having arms radiating from its upper edge and a lower toothed periphery, and gearing for engaging the teeth and driving the feed-disk, of a vibratory feed-plate located in the feed-slot and having feed-openings, and lugs located on the plate in the path of and adapted to be successively struck by the radiating arms of the feed-disk.

In testimony whereof I affix my signature in presence of two witnesses.

JAMES DROMMOND SCHOFIELD.

Witnesses:
E. J. GANNON,
J. R. ELDRIDGE.